United States Patent [19]
Takashi

[11] 4,271,411
[45] Jun. 2, 1981

[54] DETECTOR FOR DOPPLER DEVICE
[75] Inventor: Iwata Takashi, Chiba, Japan
[73] Assignee: TDK Electronics Co., Ltd., Tokyo, Japan
[21] Appl. No.: 42,751
[22] Filed: May 29, 1979
[30] Foreign Application Priority Data
 May 31, 1978 [JP] Japan .................................. 53/65169
[51] Int. Cl.³ .............................................. G01S 13/58
[52] U.S. Cl. ............................ 343/5 DD; 329/161; 333/24.2; 333/250; 343/5 PD; 343/8
[58] Field of Search ............... 329/161; 333/24.2, 248, 333/250, 1.1; 343/5 PD, 5 DD, 8

[56] References Cited
U.S. PATENT DOCUMENTS

| | | | |
|---|---|---|---|
| 3,051,908 | 8/1962 | Anderson et al. | 333/24.2 UX |
| 3,659,293 | 4/1972 | Gupta | 343/5 DD X |
| 3,883,824 | 5/1975 | Weiner | 333/250 X |

Primary Examiner—Paul L. Gensler
Attorney, Agent, or Firm—Allison C. Collard; Thomas M. Galgano

[57] ABSTRACT

A doppler detector for measuring the speed and/or the direction of a moving body utilizing the principle of the doppler effect that the reflected frequency from a moving body is slightly changed has been found. The present doppler detector comprises a rectangular waveguide inserted between a microwave oscillator and an antenna, an elongated ferri-magnetic body inserted between a pair of H planes of said waveguide, and said body being magnetized in the axial direction of the same, and a pair of diodes each inserted between H planes of said waveguide so that the first diode being symmetrical with the second diode concerning the lateral plane including the center axis of said ferri-magnetic body.

7 Claims, 6 Drawing Figures

DETECTOR FOR DOPPLER DEVICE

BACKGROUND OF THE INVENTION

The present invention relates to a doppler detector for detecting the speed and other information of a moving body by using a microwave signal, and more particularly, relates to such a device for the detection of the speed and the moving direction of a moving body.

The applicable field of the present invention is, for instance, the measurement of the speed and the direction of a car for traffic control purposes. The present invention can be in general utilized for measuring the speed and the direction of a moving body at up to several kilometers or more from the present apparatus.

It has been known that the speed, direction, distance and other qualities of a moving body can be measured by emanating microwave signals to the moving body and receiving the reflected waves from the moving body. The frequency of the reflected wave is changed from the original one due to the well known doppler effect.

If it is desired to detect only the speed of a moving body by using microwave and doppler effect, such detection can be carried out by a simple means comprising a single mixing diode disposed within a waveguide and a low pass filter for treating the signal from the mixing diode. However, in the case of detecting both the speed and the direction of a moving body, a complicated apparatus like the Japanese patent publication No. 16905/62 (after examination) must be utilized. According to the Japanese patent publication No. 16905/62, the signal from an oscillator is divided into two signals, transmitting wave toward antenna and reference wave for mixing, by using a magic T. The reference wave for mixing is then brought to two waveguides with a phase difference of $\phi$ through a phase generator, and then applied to mixing diodes disposed in the waveguides, respectively. On the other hand, the signal emanated from the antenna collides with the moving body and the reflected wave returns to the same antenna, so as to be brought to said two waveguides with the mixing diodes at the same phase angle for application to the mixing diodes, respectively. At the mixing diodes, the reference waves for mixing and the reflected wave are received and are mixed. Since the reference waves for mixing at the two diodes have the aforesaid phase difference $\phi$, the output signals from those mixing diodes have a phase difference $\phi$. The detection of the moving direction is carried out by checking whether the mutual phase difference between the output signals from the mixing diodes is $+\phi$ or $-\phi$.

However, the prior doppler device for measuring both the speed and the direction must use, in combination, a wide variety of microwave devices, including a magic T, a phase generator, the waveguide for dividing the signal, et al. As a result, the conventional doppler device has shortcoming in that the device is costly due to the complicated largescale structure.

SUMMARY OF THE INVENTION

It is an object, therefore, of the present invention to overcome the disadvantages and limitations of a prior doppler detection device by providing a new and improved doppler detection device.

It is also an object of the present invention to provide a doppler detection device in which the speed and the moving direction of a moving body are measured, and the present device is compact in size, low in manufacturing cost and free from any complicated structure.

The above and other objects are attained by a doppler detector comprising a rectangular waveguide with a pair of flanges one of which is connected to a microwave oscillator and the other of which is connected to an antenna, an elongated ferri-magnetic body inserted between a pair of H planes of said waveguide, said body being positioned perpendicular to the path of the doppler signal, said body being magnetized in the axial direction of the same by a permanent magnet, and a pair of diodes each inserted between H planes of said waveguide on the linear line along the path of the microwave signal, the first diode being positioned to be symmetrical with the second diode concerning the lateral plane including the center axis of said ferri-magnetic body.

Preferably, a filter means having a low pass filter function is connected to the output of each of said diodes.

Further preferably, a dielectric thin narrow plate is inserted between a pair of H planes of said waveguide for the fine adjustment of the phase difference between said diodes.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1A:
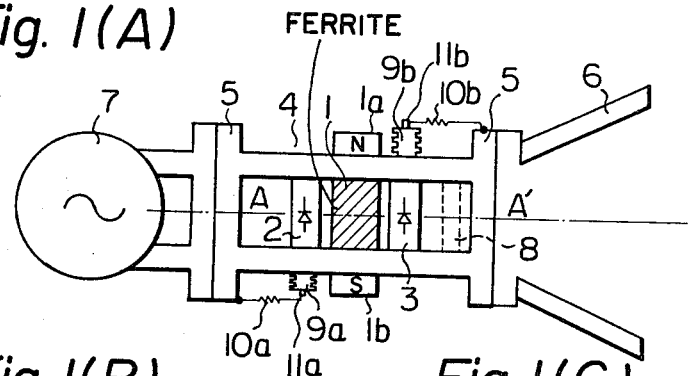
FIG. 1(A) shows the structure of the doppler detector assembly according to the present invention.
Figure 1B:
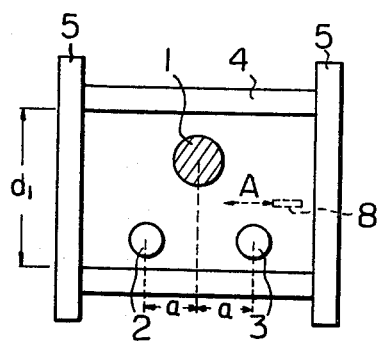
FIG. 1(B) is the cross sectional view of the doppler detector at line A—A' of FIG. 1(A)
Figure 1C:
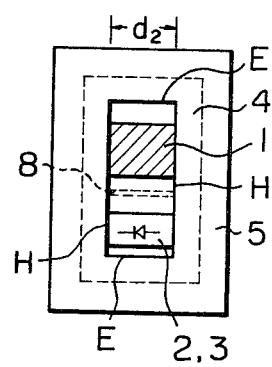
FIG. 1(C) is the side view of the present doppler detector, and shows the view from the open end of a waveguide.

In FIGS. 1(A), 1(B) and 1(C), the present doppler detector has a rectangular waveguide 4 with a pair of flanges 5 at both the ends of said waveguide 4, a horn type antenna 6 is connected to one of the flanges of said waveguide 4, and a microwave oscillator 7 is connected to the other flange of said waveguide 4.

In the waveguide 4, a circular ferri-magnetic body 1 is inserted between H-planes of the waveguide 4, said ferri-magnetic body 1 is mounted at the middle portion of the waveguide in the axial direction of said waveguide, but is not mounted at the middle of the waveguide in the lateral direction as shown in FIG. 1(B). That is to say, the length between the ferri-magnetic body 1 to one of the E-planes is not equal to the length between the same body 1 and the other E-plane. The ferri-magnetic body 1 is magnetized by permanent magnets 1a and 1b each mounted at the outside of the waveguide 4. A pair of diodes 2 and 3 are mounted between the H-planes of said waveguide 4. Those diodes are mounted along the axial direction of the waveguide 4, but are not mounted at the center of the H-planes of the waveguide 4 as shown in FIG. 1(B). The length (a) between the ferri-magnetic body 1 and the diode 2 in the axial direction of the waveguide 4 is the same as the length between the same body 1 and the other diode 3 in the axial direction. That is to say, the diode 2 and the diode 3 are symmetrical concerning the lateral plane including the axis of the ferri-magnetic body 1. That is to say, the ferri-magnetic body 1, and a pair of diodes 2 and 3 are positioned at the three vertexes of an isosceles triangle. One end of each diode is grounded to the waveguide 4, and the other end of each diode is connected to choke means or filter means 9a or 9b. These choke means operate as an inductance. A pair of load resistors 10a and 10b are connected between a top of each choke means and the ground (waveguide wall). The junction points 11a and 11b of choke means and the load resistor are the output terminals of the present doppler detector. Further, a dielectric thin plate 8 which is made of for instance Al$_2$O$_3$ is mounted between the H-planes for the fine adjustment of the phase of the output signals, and said plate 8 can be slidable in the direction (A) for the phase adjustment. Further, a small stub (not shown) may be provided in the waveguide for eliminating the standingwave ratio.

Now, the operation of the present doppler detector will be described in accordance with FIG. 2, in which the moving body 20 is moving in the direction ($\theta$) from the axis of the waveguide 4 with the speed (v), $F_L$ is the input microwave signal from the generator 7, and $F_R$ is the reflected signal of said microwave signal by the moving body 20.

Figure 2:
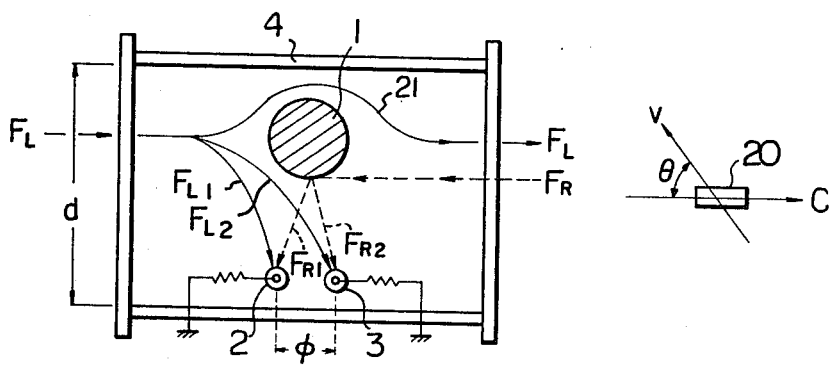
FIG. 2 is an explanatory diagram of the present doppler detector for the explanation of the operation of the present invention.

The electromagnetic field of the input microwave signal $F_L$ is rotated by the ferri-magnetic body 1 in the waveguide 4 as shown by the path 21 in FIG. 2, and said microwave signal $F_L$ is emanated to the moving body 20 from the antenna 6. In this case, a part of the power of the signal $F_L$ is leaked from the path 21 and is applied to the pair of diodes 2 and 3. Those signals $F_{L1}$ to the diode 2 and $F_{L2}$ to the diode 3 have the phase difference $\phi$ due to the difference of the position of the diodes in the axial direction of the waveguide, and those two signals $F_{L1}$ and $F_{L2}$ operate as reference signals of the doppler detector. That phase difference $\phi$ is to be supposed in a range of 0°<$\phi$<180°, and preferably 100 is 90°. The fine adjustment of the phase difference $\phi$ is possible by sliding a dielectric slip 8 (see FIG. 1(B)) in the axial direction of the waveguide 4.

On the other hand, the reflected signal $F_R$ by the moving body 20 is applied to the waveguide 4 through the antenna 6, and is also rotated by the ferri-magnetic body 1. Also, the reflected signal $F_R$ is reflected at the surface of the ferri-magnetic body 1, and this signal reflected and rotated by the ferri-magnetic body 1 is applied to the diodes 2 and 3. In this case, it should be appreciated that the phase of the reflected signal to the diode 2 is the same as that to the diode 3, since the diodes 2 and 3 are positioned symmetrically concerning the lateral plane including the axis of the ferri-magnetic body 1.

It should be appreciated from the above explanation that the reference signal is applied to the diodes with the phase difference $\phi$, while the reflected signal is applied to the diodes with no phase difference.

Accordingly, the diode 2 mixes the signal $F_{L1}$ and the reflected signal $F_{R1}$, and the diode 3 mixes the signal $F_{L2}$ and the reflected signal $F_{R2}$. The mathematical analysis of the present doppler detector is shown below, wherein C is the propagating velocity of the microwave signal, (v) is the speed of the moving body 20, $\theta$ is the angle between the emanating direction of the microwave signal and the moving direction of the moving body 20, and (a), (A) and (B) are constants.

The first reference signal $F_{L1}$ applied to the diode 2 is given by;

$$F_{L1} = a \sin \omega t \qquad (1)$$

The second reference signal applied to the diode 3 is given by;

$$F_{L2} = a \sin (\omega t + \phi) \qquad (2)$$

The component of the reflected signal $F_{R1}$ which returns to the diode 2 is given by;

$$F_{R1} = A \sin (\omega + \frac{2\omega V \cos\theta}{C}) t \qquad (3)$$

The component of the reflected signal $F_{R2}$ which returns to the diode 3 is given by;

$$F_{R2} = F_{R1} = A \sin (\omega + \frac{2\omega V \cos\theta}{C}) t \qquad (4)$$

Therefore, the doppler signal output from the diode 2 is given by the formula (5), wherein the high frequency component (sin $\omega t$) is cut off by the low pass filter with a choke means and the resistor.

$$F_{D1} = B \sin \frac{2\omega V \cos\theta}{C} t \qquad (5)$$

Also, the doppler signal output from the diode 3 is given by the formula (6), wherein the high frequency component (sin $\omega t$) is cut off by the low pass filter with a choke means and the resistor.

$$F_{D2} = B \sin (\frac{2\omega V \cos\theta}{C} + \phi)t \qquad (6)$$

The moving direction of the moving body 20 is detected by the fact that, in comparing the phase angles of the formulae (5) and (6), the phase difference therebetween becomes positive or negative depending on the sign of cos$\theta$. That is to say, when 0°≦$\theta$≦90°, the value cos $\theta$ becomes positive, and when 90°≦$\theta$≦180°, the value cos $\theta$ becomes negative.

Thus, it is possible to detect the speed and the direction of a moving body by solving the formulae (5) and (6), and an apparatus for solving those formulae has been well known in the art.

According to our experiments, it has been found that the best characteristics can be obtained when the spacing between the two diodes 2 and 3 is 1.5 times the diameter of the diode 2 or 3 (when the diodes 2 and 3 are 1N23), and when the center of the ferri-magnetic body 1 and the centers of the diodes 2 and 3 are located with a distance equivalent to about ¼ of the inner width of the waveguide 4 (the width of the H-plane d$_1$) as measured from the nearest inner surface of side walls of the waveguide 4.

Figure 3:
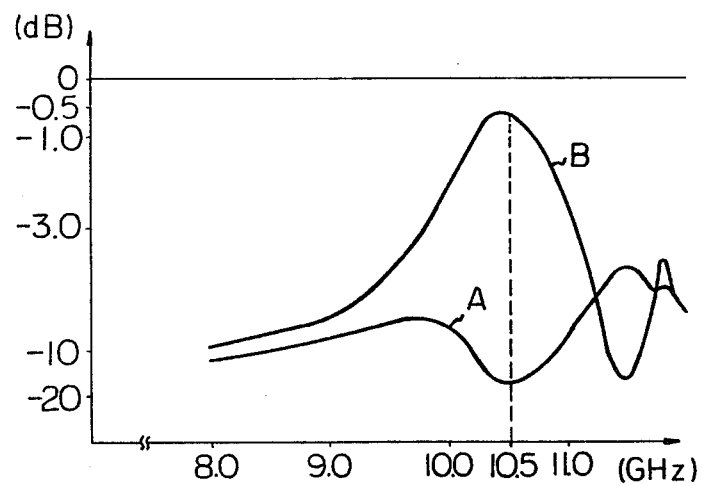
FIG. 3 shows the experimental curves showing the loss characteristics of both the forward direction and the backward direction of the doppler detector according to the present invention.

FIG. 3 is a graph showing the through characteristics of the waveguide 4 on the above structure. The curve (A) of FIG. 3 shows the insertion loss of the reverse direction (the direction from right to left in FIG. 1(A)), and the curve (B) shows the insertion loss of the forward direction (the direction from left to right in FIG. 1(A)). Of course it is preferable that the forward loss is smaller, and the backward loss is larger, so the operational frequency for the waveguide of FIG. 3 is 10.5 GH$_z$. The present doppler detector has the similar characteristics to a microwave isolator which provides a small loss in a forward direction and a large loss in a backward direction, since the backward signal in the waveguide is absorbed by the diodes 2 and 3.

Figure 4:
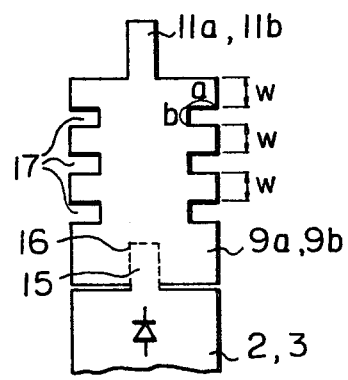
FIG. 4 shows the detailed structure of a filter means utilized in the present doppler detector.

FIG. 4 shows the detailed structure of filter means 9a and 9b. The filter means 9a and/or 9b is generally a conductive elongated circular body having a small hole 16 at the bottom for accepting the top cap 15 of the diode 2 or 3, and a top cap 11a to 11b which functions as an output terminal of the doppler detector. Also, there are provided at least three ring shaped recesses 17 on the surface of the circular body along the axial direction, thus, at least three disk shaped bodies are formed. The width (w) of each disk shaped body is ¼ of the wavelength, the depth (a) of the recess 17 is, in 10 GH$_z$ band, preferably 1.5 mm, and the duration (b) of the disk shaped bodies is in 10 GH$_z$ band preferably 0.5 mm.

According to the preferable embodiment of the present invention, the waveguide 4 is WRJ-10 waveguide ($d_1 = 22.9$ mm and $d_2 = 10.2$ mm in FIGS. 1(B) and 1(C)), the frequency is 10.5 GH$_z$, the diodes 2 and 3 are 1N23, the material of the ferri-magnetic body 1 is $M_g$—$M_n$ ferrite, the diameter of said body 1 is 5.8 mm, and the material of filter means 9a and/or 9b is bronze. Another possible material of said ferri-magnetic body 1 is $M_g$—$M_n$—Al spinel ferrite, $C_u$—$Z_n$ spinel ferrite, $N_i$—$Z_n$ spinel ferrite, and Y—Al garnet ferrite.

As described in the foregoing, the doppler detector according to the present invention is featured in the very small and compact size, simple structure, small insertion loss, high sensitivity due to the fact that almost all the reflected signal is absorbed by the diodes, and inherent protective function to the oscillator.

It should be appreciated that the present doppler detector doubles as an isolator as shown in FIG. 3, a microwave oscillator is protected from the reflected harmful signal without utilizing the particular isolator.

Also, it should be appreciated that the present doppler detector is simple in structure, without utilizing a magic T, a phase generator, and a branched waveguide.

From the foregoing it will now be apparent that a new and improved doppler detector device has been found. It should be understood of course that the embodiments disclosed are merely illustrative and are not intended to limit the scope of the invention. Reference should be made to the appended claims, therefore, rather than the specification as indicating the scope of the invention.

What is claimed is:
1. A doppler detector comprising;
  (a) a rectangular waveguide having a pair of H plane walls and a pair of E plane walls and a pair of flanges at both the extreme ends of said walls, one of said flanges being connected to a microwave oscillator, and the other flange being connected to an antenna,
  (b) an elongated ferri-magnetic body inserted between a pair of H planes of said waveguide, said ferri-magnetic body being positioned perpendicular to the path of the doppler signal, and said body being magnetized in the axial direction of the same by a permanent magnet,
  (c) a pair of diodes each inserted between H planes of said waveguide on the linear line along the path of the doppler signal, the first diode being positioned to be symmetrical with the second diode concerning the lateral plane including the center axis of said ferri-magnetic body, and the outputs of the doppler detector being provided from the outputs of said diodes.

2. A doppler detector according to claim 1, further comprising choke means between the output of each diode and an output terminal, said choke means comprising a conductive elongated circular body having a plurality of disk shaped bodies, the width of each disk shaped body being approximate ¼ of the wavelength of the microwave signal.

3. A doppler detector according to claim 1, further comprising a dielectric thin narrow plate inserted between a pair of H planes of said waveguide for fine adjusting the phase difference between said diodes.

4. A doppler detector according to claim 1, wherein the cross section of said ferri-magnetic body is circular.

5. A doppler detector according to claim 1, wherein said diodes are 1N23, and the length between said diodes is 1.5 times as large as the diameter of the diode itself.

6. A doppler detector according to claim 1, wherein said permanent magnet is mounted outside the waveguide.

7. A doppler detector according to claim 1, wherein said ferri-magnetic body is made of $M_g$—$M_n$ ferrite.

* * * * *

UNITED STATES PATENT OFFICE
CERTIFICATE OF CORRECTION

Patent No. 4,271,411         Dated  June 2, 1981

Inventor(s) TAKASHI IWATA

It is certified that error appears in the above-identified patent and that said Letters Patent are hereby corrected as shown below:

In box (75) change "Iwata Takashi" to --Takashi Iwata--.
Column 3, line 47, change "100" to --$\phi$--.
Column 5, line 17, change "to" to --or--.

Signed and Sealed this

Ninth Day of February 1982

[SEAL]

Attest:

GERALD J. MOSSINGHOFF

Attesting Officer        Commissioner of Patents and Trademarks